United States Patent
Eidsmore

(10) Patent No.: US 11,892,860 B1
(45) Date of Patent: Feb. 6, 2024

(54) CYLINDER REGULATOR

(71) Applicant: Paul G. Eidsmore, Santa Cruz, CA (US)

(72) Inventor: Paul G. Eidsmore, Santa Cruz, CA (US)

( * ) Notice: Subject to any disclaimer, the term of this patent is extended or adjusted under 35 U.S.C. 154(b) by 0 days.

(21) Appl. No.: 17/883,021

(22) Filed: Aug. 8, 2022

Related U.S. Application Data

(60) Provisional application No. 63/230,600, filed on Aug. 6, 2021.

(51) Int. Cl.
G05D 16/06 (2006.01)
F17C 13/04 (2006.01)

(52) U.S. Cl.
CPC .......... G05D 16/065 (2013.01); F17C 13/04 (2013.01); G05D 16/0622 (2013.01); *F17C 2201/0104* (2013.01); *F17C 2205/0338* (2013.01)

(58) Field of Classification Search
CPC ........ Y10T 137/7823; Y10T 137/7819; G05D 16/065; G05D 16/0622; F17C 13/04; F17C 2201/0104; F17C 2205/0338
See application file for complete search history.

(56) References Cited

U.S. PATENT DOCUMENTS

| 4,077,422 A * | 3/1978 | Brinkley ............... F17C 13/12 137/68.14 |
| 5,303,734 A * | 4/1994 | Eidsmore ........... G05D 16/0616 251/80 |
| 2002/0050142 A1* | 5/2002 | Wang ....................... F17C 7/04 62/48.1 |
| 2019/0154252 A1* | 5/2019 | Doughty ............ G05D 16/0661 |
| 2019/0339726 A1* | 11/2019 | Jones ...................... F16K 17/24 |

FOREIGN PATENT DOCUMENTS

FR 2775048 A1 * 8/1999 ........... F16K 17/087

* cited by examiner

*Primary Examiner* — Jessica Cahill
(74) *Attorney, Agent, or Firm* — LIPPES MATHIAS LLP

(57) ABSTRACT

A regulator is adapted to connect to a gas cylinder, particularly at a location upstream of a cylinder valve, and the regulator may include at least one of a filling slide component, oscillation damper, charge port, and a reset assembly. The regulator includes a body enclosing a cavity, and an inlet passage configured to attach to an associated gas cylinder and an outlet passage configured to attach to an associated cylinder valve, the inlet and outlet passages in selective fluid communication with one another. A flexible diaphragm/bellows is interposed between the inlet and outlet passages. A poppet assembly is located between the inlet and outlet passages that selectively seals with a poppet seat to regulate fluid flow between the inlet and outlet passages.

19 Claims, 12 Drawing Sheets

CYLINDER REGULATOR

BACKGROUND

This application claims the priority benefit of, and expressly incorporates herein by reference the entire disclosure of, U.S. provisional application Ser. No. 63/230,600, filed Aug. 6, 2021.

Cylinder pressure regulators used to control gas pressure exiting a cylinder are typically attached directly to the cylinder valve via a compressed gas association (CGA) fitting. Cylinders are typically filled with 2000 PSIG of gas and consequently when the cylinder valve is opened, or if the cylinder valve or CGA fitting were inadvertently damaged, the pressurized gas would exit the cylinder valve or fitting at 2000 PSIG. One response to this situation is the requirement of transportation regulations that all cylinders have a safety cap installed over the cylinder valve prior to transporting. The safety cap is intended to limit the potential and/or prevent an accidental breaking off of the cylinder valve if the cylinder were to tip over and the cylinder valve strikes a solid object.

Another manner of addressing this situation is to place a regulator upstream of or before the cylinder valve. Placement of the regulator before the cylinder valve; however, creates several new challenges. For example, the regulator is typically downstream of the cylinder valve and connected thereto with a CGA fitting. Thus, the regulator is easily removed before filling. Locating the regulator upstream of the cylinder valve presents the additional challenge that during the filling operation of the cylinder, current regulators that include a poppet and a poppet orifice that advantageously regulate flow out of the cylinder, will undesirably restrict this reverse flow into the cylinder.

Another challenge of this placement of the regulator upstream of the cylinder valve is that a pressure gauge that indicates the cylinder pressure is typically located on the regulator downstream of the cylinder valve. Thus, some other manner of indicating cylinder pressure is required if the regulator is upstream of the cylinder valve. For example, using supply pressure effect sensing as shown and described in U.S. 5,238,016 (the entire disclosure of which is expressly incorporated herein by reference), or alternatively a strain gauge placed on the surface of the cylinder could be used to detect minute changes in the wall of the cylinder associated with a change in pressure in the cylinder, are possible ways to sense the pressure in the cylinder if the regulator is placed upstream of the cylinder valve.

In another known system that puts the regulator upstream of the cylinder valve, a preset regulator (sometimes two in series) is placed inside the cylinder to accomplish the above results. This requires a special cylinder with a larger than standard opening. The regulator(s) has/have to be small enough to fit through this opening which limits the diaphragm or bellows area that is affected by gas pressure. Because of the dimensional constraints, two regulators are often used in order to get enough effective diaphragm or bellows area. High purity welding is involved to provide such a system. Even then, if the cylinder is impacted the regulators could break off inside the cylinder which leads to further issues.

Thus, a need exists for an improved cylinder regulator that overcomes these problems and others associated with known cylinder regulators, and provides at least one or more features described herein, as well as still other features and benefits.

SUMMARY

A new regulator and assembly incorporating the regulator are disclosed herein, the regulator adapted to connect to a gas cylinder, particularly at a location upstream of a cylinder valve, and the regulator may include at least one of a filling slide component, oscillation damper, charge port, and a reset assembly.

The regulator includes a body enclosing a cavity, an inlet passage configured to attach to an associated gas cylinder, and an outlet passage configured to attach to an associated cylinder valve. The inlet and outlet passages are adapted to be in selective fluid communication with one another. The regulator further includes a first flexible member or first diaphragm/bellows between the inlet and outlet passages, and a poppet assembly located between the inlet and outlet passages that selectively seals with a poppet seat to regulate fluid flow between the inlet and outlet passages.

A component having first and second states, the first state limiting flow in a gas cylinder filling direction from the outlet passage to the inlet passage of the regulator, and the second state permitting flow in the gas filling direction.

The component is preferably a sliding component having a seal member thereon that seals with the body in the first state, and is spaced from the body in the second state.

The sliding component may include a recess that receives the poppet therein, and the sliding component includes at least one channel on an external surface thereof.

The sliding component may include an opening at one end of the recess, the opening dimensioned to receive a poppet stem therethrough, and the sliding component forms a poppet seat that the poppet selectively engages.

The poppet stem selectively engages a first flexible member faceplate that includes a passage therethrough that communicates with the inlet and outlet passages of the regulator.

The regulator further includes a second flexible member or second diaphragm/bellows spaced from the first diaphragm/bellows to form a pressure chamber therebetween.

The regulator may further include a charge port that selectively communicates from external to the regulator with the pressure chamber between the first diaphragm/bellows and the second diaphragm/bellows to set or reset a pressure in the pressure chamber.

The regulator may further include an oscillation damper received in the body to prevent the first diaphragm/bellows from going into an out of control oscillation mode.

The oscillation damper is preferably dimensioned for receipt in the body through the outlet passage.

The regulator may further include an excess flow valve received in the body between the inlet passage and the outlet passage, and the excess flow valve includes a shut off poppet that selectively engages an excess flow valve seat.

The regulator may include a reset mechanism that selectively engages the excess flow valve and moves the excess flow valve shut off poppet from an engaged position with the excess flow valve seat.

The reset mechanism preferably includes a hard member mounted on the excess flow valve shut off poppet, and the reset mechanism includes a piston that selectively engages the hard member to move the excess flow valve shut off poppet from the engaged position with the excess flow valve seat.

The reset mechanism may include a tube that slidingly receives the piston therein, and the piston includes a first magnet therein and the reset mechanism includes a second magnet located externally of the regulator body.

The regulator may further include a spring in the tube that urges the piston toward the second magnet.

The piston may include a tapered surface that selectively engages the hard member of the excess flow valve.

One benefit of the present disclosure is that the regulator threads or screws directly into an inlet port of a gas cylinder, and a cylinder valve is then screwed into an outlet port of the regulator, hence, the cylinder valve being downstream of the regulator controls only the regulated pressure, and does not control the full cylinder pressure.

Another advantage of this regulator is that pressurized gas would only exit the cylinder valve at a substantially reduced pressure and creates a much safer situation than the typical situation where the gas exiting the cylinder valve is at a substantially elevated pressure.

Still another benefit is that the regulator of the present disclosure is capable of controlling either a positive pressure or a vacuum.

Yet another advantage resides in the compact dimension of the new regulator with a very low profile.

A still further benefit of the present disclosure is that even though the new regulator cannot be removed for a filling operation, the new regulator has a way that the regulator poppet can be bypassed during the filling operation.

The compact, low profile design of the new regulator advantageously allows the new regulator to fit under the cylinder valve cap yet have a large diameter first diaphragm/bellows which greatly increases the effective area of the first flexible member and which increases the sensitivity of the regulator control.

Still another unique feature is that the new regulator has a structural arrangement that allows rapid filling of the cylinder.

Further, this regulator design uses a poppet retaining wafer that (i) provides for the poppet stem and poppet to be attached to the faceplate of the first flexible member; (ii) rotation of the poppet stem is prevented when installing the poppet, and the stem can shift slightly from side to side so the poppet can center itself in the poppet orifice; and a slide component surrounding the poppet can slide away from its seal during the cylinder filling operation.

Still other benefits and advantages will become more apparent to those skilled in the art upon reading and understanding the following detailed description.

DETAILED DESCRIPTION

Figure 1:
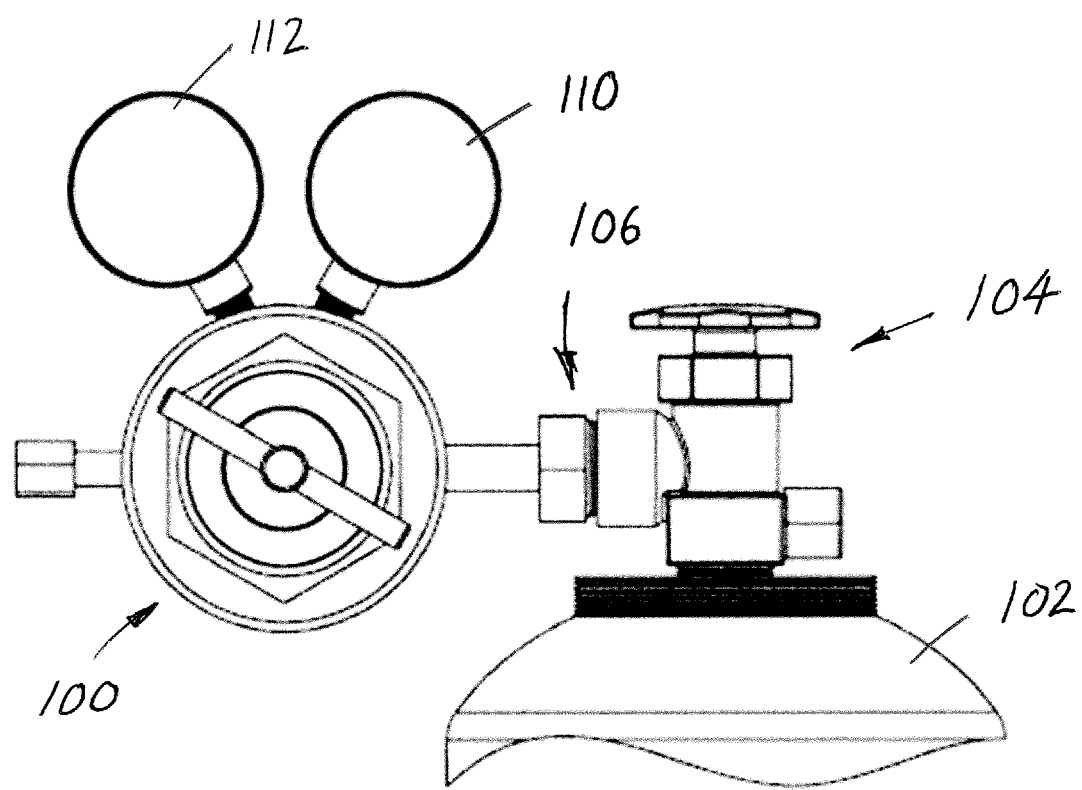
FIG. 1 shows how a cylinder valve and regulator are most commonly used today.

This description along with reference to the accompanying drawings is provided to assist in a comprehensive understanding of one or more embodiments of the present disclosure. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. Various exemplary embodiments of the present disclosure are not limited to the specific details of different embodiments and should be construed as including all changes and/or equivalents or substitutes included in the ideas and technological scope of the appended claims. In describing the drawings, where possible similar reference numerals are used for similar elements.

The terms "include" or "may include" used in the present disclosure indicate the presence of disclosed corresponding functions, operations, elements, and the like, and do not limit additional one or more functions, operations, elements, and the like. In addition, it should be understood that the terms "include", "including", "have" or "having" used in the present disclosure are to indicate the presence of components, features, numbers, steps, operations, elements, parts, or a combination thereof described in the specification, and do not preclude the presence or addition of one or more other features, numbers, steps, operations, elements, parts, or a combination thereof.

The terms "or" or "at least one of A or/and B" used in the present disclosure include any and all combinations of words enumerated with them. For example, "A or B" or "at least one of A or/and B" mean including A, including B, or including both A and B.

Although the terms such as "first" and "second" used in the present disclosure may modify various elements of the different exemplary embodiments, these terms do not limit the corresponding elements. For example, these terms do not limit an order and/or importance of the corresponding elements, nor do these terms preclude additional elements (e.g., second, third, etc.) The terms may be used to distinguish one element from another element. For example, a first mechanical device and a second mechanical device all indicate mechanical devices and may indicate different types of mechanical devices or the same type of mechanical device. For example, a first element may be named a second element without departing from the scope of the various exemplary embodiments of the present disclosure, and similarly, a second element may be named a first element.

It will be understood that, when an element is mentioned as being "connected" or "coupled" to another element, the element may be directly connected or coupled to another element, and there may be an intervening element between the element and another element. To the contrary, it will be understood that, when an element is mentioned as being "directly connected" or "directly coupled" to another element, there is no intervening element between the element and another element.

The terms used in the various exemplary embodiments of the present disclosure are for the purpose of describing specific exemplary embodiments only and are not intended to limit various exemplary embodiments of the present disclosure. As used herein, the singular forms are intended to include the plural forms as well, unless the context clearly indicates otherwise. Use of dimensions, temperatures, ranges, time, relationships (e.g., "perpendicular", "parallel"), etc., that either use or do not use further adjectives such as "generally", "substantially", "about", or "approximately" in the description or claims are intended to cover both the specific dimension, temperature, range, time, relationship, etc., as well as a range of equivalents (function, way, or result) and only intended to be limited by teachings of the prior art.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having inconsistent or exaggerated meanings unless they are clearly defined in the various exemplary embodiments.

This written description uses examples to describe the disclosure, including the best mode, and also to enable any person skilled in the art to make and use the disclosure. Other examples that occur to those skilled in the art are intended to be within the scope of the invention if they have structural elements that do not differ from the same concept or that do not differ from the literal language herein, or if they include equivalent structural elements with insubstantial differences from the same concept or from the literal description language.

Cylinder pressure regulators 100 used to control the gas pressure exiting a cylinder 102 are typically attached directly to a cylinder valve 104 via a CGA (compressed gas association) fitting 106 such as shown in FIG. 1. Cylinders are typically filled with gas at an elevated pressure ranging, for example, from about 1800 PSIG to about 3000 PSIG, although these ranges are exemplary only and should not be deemed limiting. If, for example, the regulator 100 is set to a predetermined pressure (e.g., 60 PSIG) then gas would exit the cylinder valve 104 at, e.g., 2000 PSIG, and the regulating valve would reduce the gas flow exiting the regulator to the desired reduced pressure of 60 PSIG. A first pressure gauge 110 indicates the cylinder pressure and is typically located on the regulator 100 downstream of the cylinder valve 104. A second regulator 112 indicates the gas pressure downstream of the regulator 100.

Figure 2:
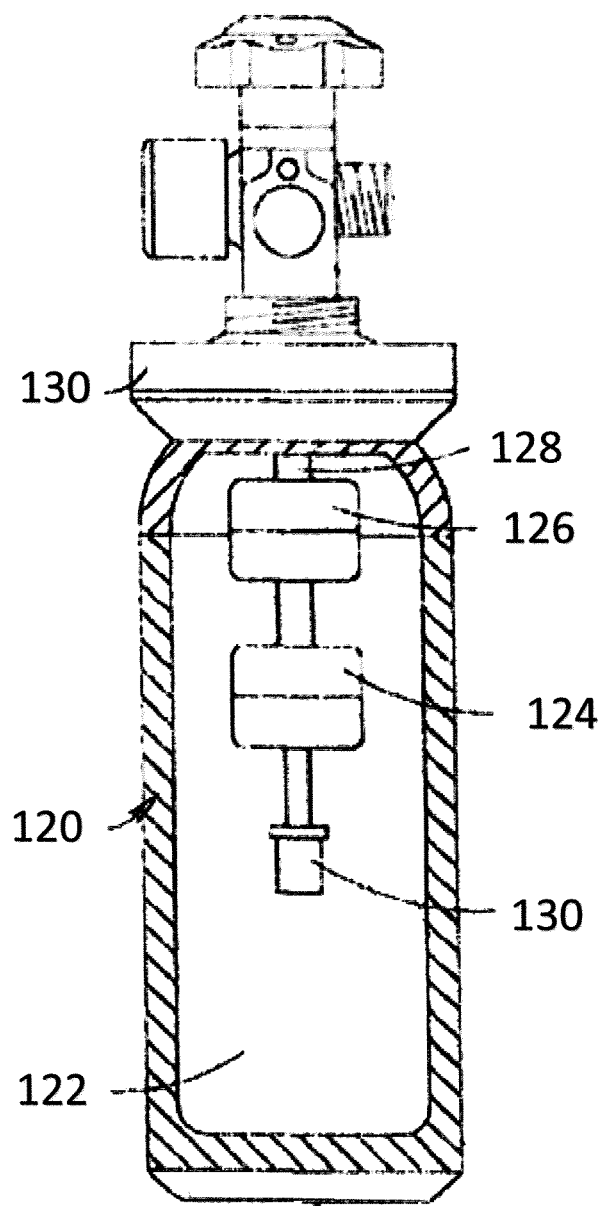
FIG. 2 shows a prior arrangement where two preset regulators are installed inside a gas cylinder.

It has been previously proposed to reduce the pressure exiting the gas cylinder. For example, FIG. 2 shows a cylinder 120 enclosing a pressurized chamber or cavity 122. At least one preset regulator 124, and in some instances a second preset regulator 126, are mounted on a fluid passage 128 that includes an inlet 130 that receives gas from the cavity 122, communicates with the first regulator 124, and with a second regulator 126 if provided. The regulators 124, 126 are installed inside the gas cylinder 120. To mount the sufficiently sized regulators 124, 126 inside the cylinder 120, a special cylinder with a larger than standard opening 130 is required. The regulators 124, 126 have to be small enough to fit through this enlarged opening 130 which limits the area of a diaphragm or bellows that is affected by gas pressure. Two regulators 124, 126 are often used in order to provide enough effective area for effective operation of the regulators. High purity welding is involved with this specialized assembly of FIG. 2. If the cylinder 120 is impacted, the regulators 124, 126 could break off inside the cylinder.

Figure 3:
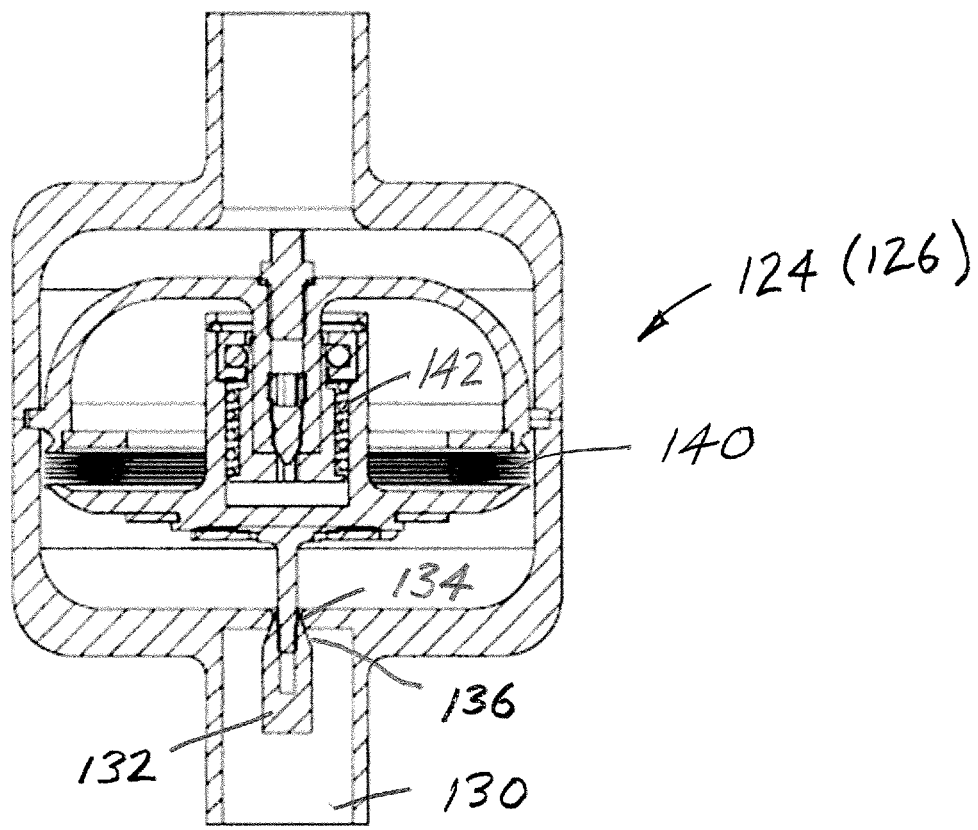
FIG. 3 illustrates the internal components of a state of the art preset regulator.

A typical, exemplary preset regulator 124 (126) is shown in FIG. 3 and has an inlet passageway 130 that contains a poppet 132 and poppet orifice 134. The poppet 132 has a tapered end 136 that approximately matches a tapered hole or opening in the orifice 134 such that the poppet will make a seal with the orifice when it is engaged under a slight force. The poppet 132 is mechanically linked to a bellows or diaphragm 140 downstream of the poppet orifice 134. The inlet gas pressure coming through the poppet orifice 134 applies a force on one side of the diaphragm 140, and a spring 142 and/or gas pressure applies a force on the other side which is the adjustment or set pressure of the preset regulator 124. When the inlet gas pressure exceeds the set pressure the poppet 132 is urged to the closed position stopping any further increase in pressure.

Figure 4:
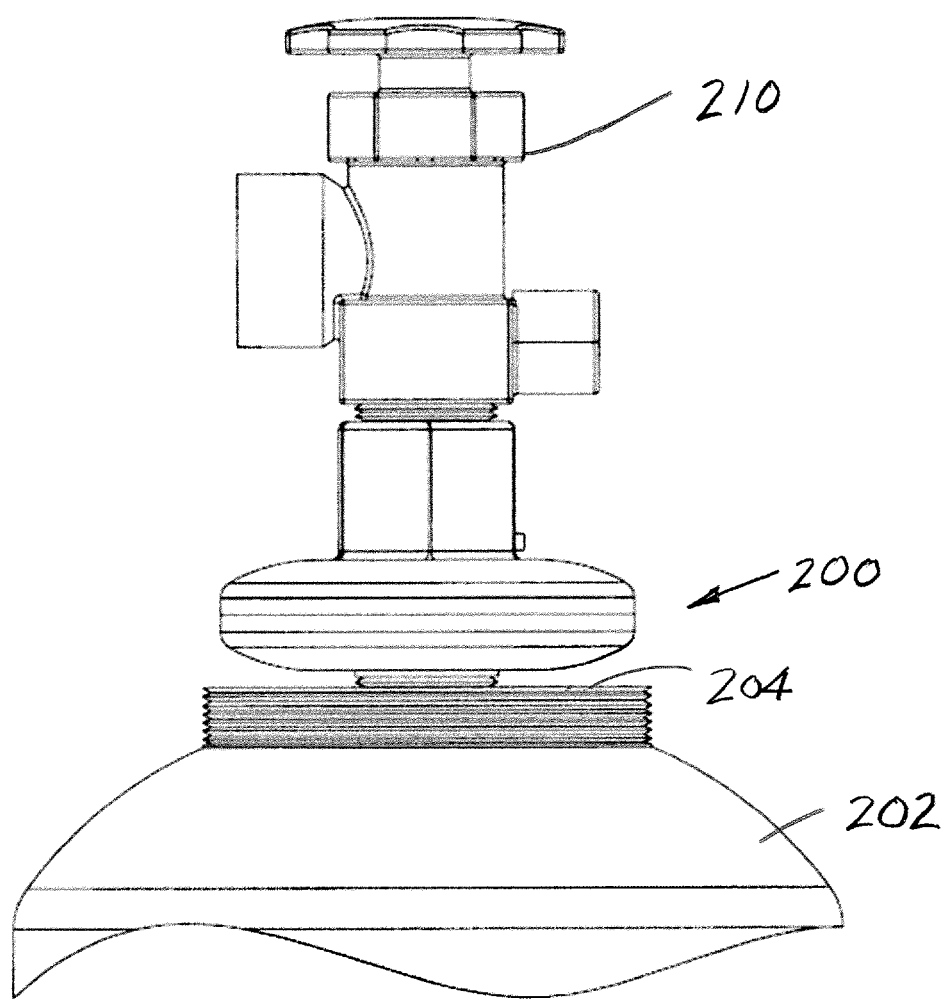
FIG. 4 shows a new regulator of the present disclosure installed into a gas cylinder and a cylinder valve installed into an outlet port of the regulator.

The design of a new regulator 200 of the present disclosure is unique because the regulator is fastened, i.e., the regulator screws, directly into a gas cylinder 202, and particularly is threaded into an inlet port 204 of a gas cylinder (FIG. 4). A cylinder valve 210 is then fastened to (e.g., threaded or screwed into) an outlet port 212 of the regulator 200 (FIG. 4), hence, the cylinder valve being downstream of the regulator, controls only the regulated pressure, not the full cylinder pressure. This regulator 200 is capable of controlling either a positive pressure or a vacuum. As noted previously, cylinders are typically filled with pressurized gas. If, for example, this regulator 200 is set to 60 PSIG then the gas would only exit the cylinder valve 210 at 60 PSIG creating a much safer situation than the typical situation where the gas exiting the cylinder valve is at an elevated pressure, e.g., 2000 PSIG.

Another situation might be that this regulator is set at a vacuum, say 20 in of Hg. If the cylinder valve 210 is opened with a cylinder 202 containing 2000 PSIG, no gas would exit the cylinder until a vacuum of 20 in. of Hg is created downstream of the cylinder valve, this results in an even safer situation. Placement of the regulator 200 before the cylinder valve 210 creates several new challenges. One challenge is that transportation regulations requires that all cylinders have a safety cap (not shown) installed over the cylinder valve 210 prior to transporting to prevent an accidental breaking off of the valve if the cylinder 202 were to tip over and the valve strikes a solid object. This requires that the regulator 200 be compact with a very low profile (FIG. 4).

Another challenge of this placement of the regulator 200 is that the pressure gauge that indicates the cylinder pressure is typically located on the regulator downstream of the cylinder valve (as described in connection with FIG. 1). The cylinder pressure with this new regulator 200 installed can be determined, for example, by using supply pressure effect pressure sensing as described in patent number U.S. Pat. No. 5,238,016, the entire disclosure of which is incorporated herein by reference, or some other means.

Figure 5:
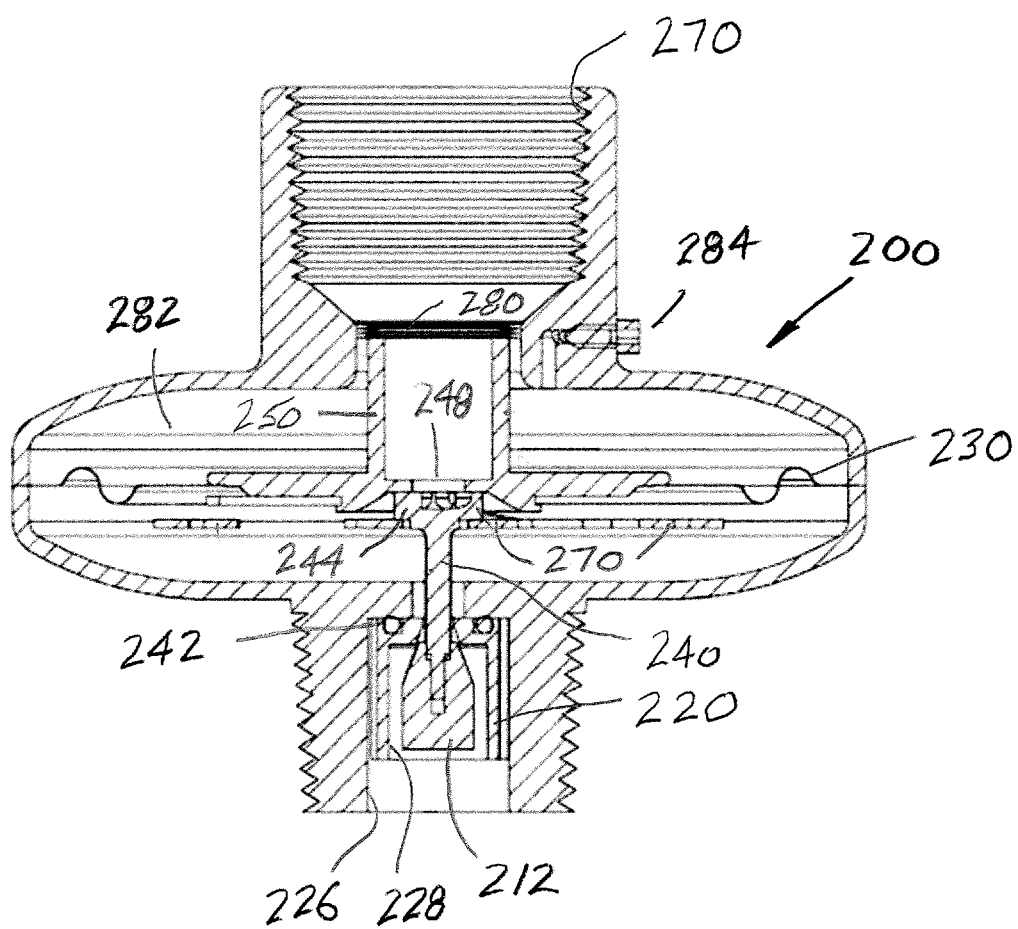
FIG. 5 shows a longitudinal cross-sectional view of the regulator shown in FIG. 4.
Figure 6:
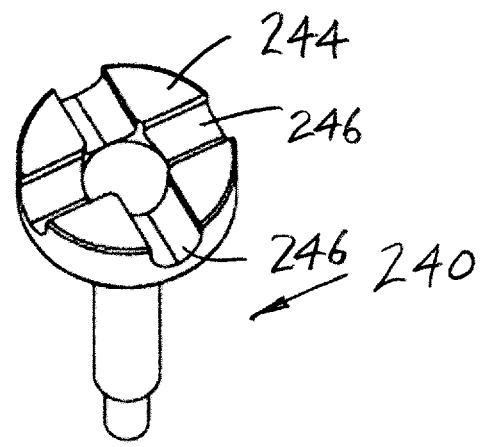
FIG. 6 is an enlarged view of a poppet stem that illustrates how flow proceeds around a base of the stem and into an outlet port of the regulator.
Figure 7:
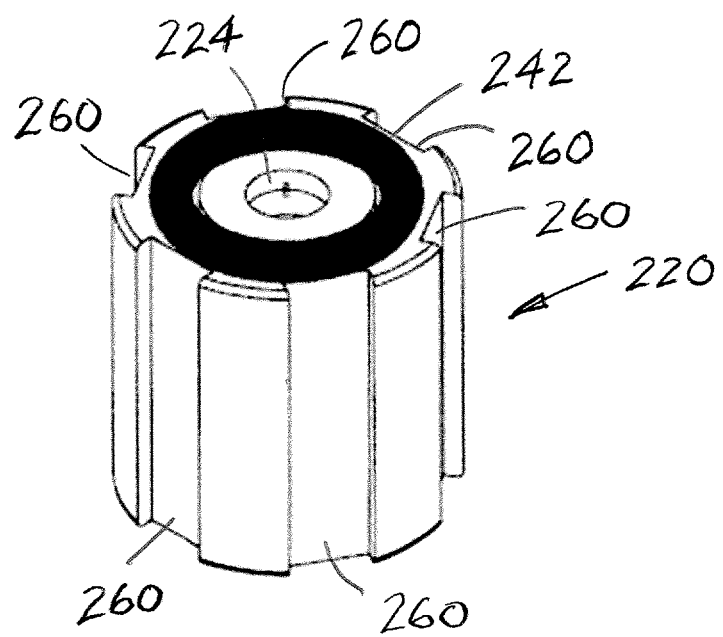
FIG. 7 is a perspective view of a cylinder filling slide component that provides a cylinder filling passageway around the poppet and orifice, and including a seal on an end thereof that prevents gas in the cylinder from proceeding through this passageway when not filling.

Yet another challenge of this location of the regulator 200 is during the filling operation of the cylinder 202. With current regulators, the poppet and the poppet orifice will restrict this reverse flow into the cylinder. Typically, the regulator is downstream of the cylinder valve connected with a CGA fitting, so the regulator is easily removed before filling. This new regulator 200 cannot be removed for the filling operation. However, this regulator 200 has a mechanism or means for the poppet to be bypassed during the filling operation. Particularly, the bypass mechanism incorporates a slide component 220 that houses poppet 222 and poppet orifice 224 assembly (FIG. 5). As shown in FIG. 5, the slide component 220 is received in the inlet passage 226 of the regulator 200. The slide component 220 has a recess 228 at a first or lower end that receives the poppet 212, and the poppet is secured to a flexible member such as a bellows or the illustrated movable diaphragm 230 via stem 240. Diaphragm 230 is sealed at an outer diameter portion with the regulator housing or body and along an inner diameter with diaphragm faceplate 250. The opening 224 in the second or upper end of the slide component 220 forms the poppet seat that the poppet 212 sealingly engages in a closed position (FIG. 5). Further, in this closed position, the slide component 220 includes a seal member 242 (FIGS. 5 and 7) that sealingly engages a surface of the regulator housing. An enlarged end 244 (FIG. 6) of the poppet stem 240 includes passages 246 that allow the gas to flow around the valve stem. The enlarged end 244 otherwise engages around an opening 248 in the mounting portion or diaphragm faceplate 250 of the diaphragm 230. The slide component 220 includes passages or channels 260 (FIG. 7) preferably formed on an external surface thereof to allow flow therepast as will be described below.

Figure 8:
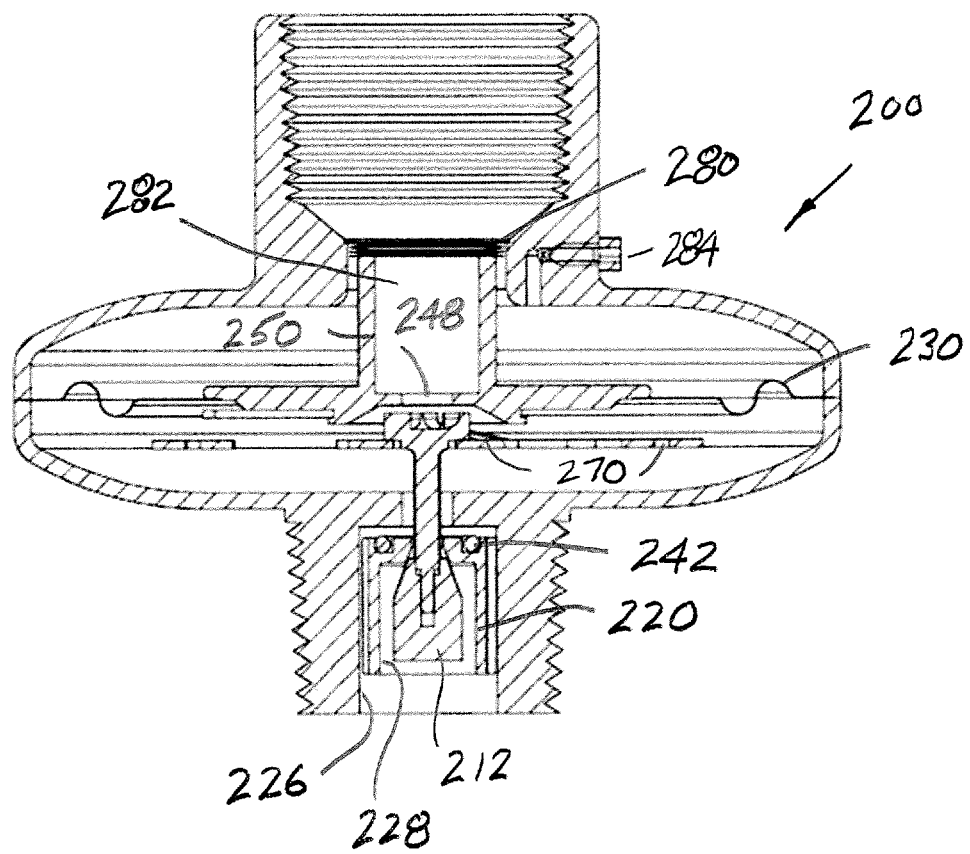
FIG. 8 is a longitudinal cross-sectional view showing the filling slide component of FIG. 7 forced open by the flow filling the cylinder.

This slide component 220 (FIG. 7) will slide down under the pressure of the incoming gas during cylinder filling, and open up a large flow path therearound that will allow rapid cylinder filling. As shown in FIG. 8, the filling slide component 220 is forced open by the flow filling the cylinder. The poppet retaining wafer (PRW) 270 is shown stretched out to allow this movement of the slide component 220. As evident in FIG. 8, the poppet 212 is seated in the poppet seat 214, the sliding component 220 is urged downwardly in the passage 226 such that seal 242 of the sliding component is separated from the regulator housing surface and allows flow around the poppet stem 240. Further, the enlarged end 244 of the poppet stem 240 is separated from the opening 248. Thus, gas flow through the outlet 270 of the regulator 200 toward the inlet passage 226 of the regulator during the cylinder filling process is substantially opened to allow desired rapid filling of the cylinder 202.

Another unique feature is that this regulator 200 has a compact and very low profile design which allows the regulator to fit under the cylinder valve cap (not shown) yet has a large diameter first flexible member 230 (such as the illustrated diaphragm or bellows) which greatly increases the effective area of the first flexible member and which increases the sensitivity of the regulator control.

Further, the design of this regulator 200 uses the poppet retaining wafer (PRW) 270 to attach the poppet 212 to faceplate 250 of the first flexible member. The faceplate 250 has a central portion that forms a passage that is selectively closed by the enlarged end of the poppet stem engaging the faceplate (FIG. 5). When the enlarged end 244 of the poppet stem 240 moves away from the central portion of the faceplate 250, the passage through the faceplate is in fluid communication with the inlet and outlet passages (FIG. 8). The PRW 270 is made of a spring material such as spring steel or inconel. The PRW 270 has three main functions. First, the PRW 270 provides for the poppet stem 240 and poppet 212 to be attached to the faceplate 250 of the first flexible member. Secondly, the PRW 240 has a polygonal or square hole in the center which is mated to a similarly shaped polygonal or square section on the poppet stem 240 to prevent rotation of the stem when installing the poppet. The square hole in the PRW 240 is larger than the square section on the poppet stem 240 which allows the stem to shift from side to side slightly so the poppet 212 can center itself in the poppet orifice 224. The spring force holds it in place. A third important function of the PRW 270 is that it allows the slide component 220 (and seal 242 at one end) surrounding the poppet 212 to slide away from its sealed engagement with the regulator housing during the cylinder filling operation.

The regulator 200 incorporates both the first flexible member 230 (first diaphragm/bellows) and a second flexible member or second diaphragm/bellows 280 (the second flexible member (bellows 280) seals between the faceplate and the regulator body) creating a pressure chamber 282 between the two components that is accessible via a charge port 284 from outside the regulator (this is commonly referred to as a dome loaded regulator). This allows the regulator 200 to be set or reset at any time. Preset regulators installed inside the cylinder (e.g., FIGS. 2-3) cannot be reset.

Another advantage of this charge port 284 being accessible is that the regulator 200 can be controlled by connecting another regulator to this port. If for example an engineer wanted the pressure to rise slowly, creating what is known as a "soft start", an electronically controlled regulator (not shown) could be connected to this port 284. Also, a low purity regulator (not shown) could be used to control a high purity gas, or a simple plastic regulator could be used to control a highly corrosive or flammable gas.

Figure 9:
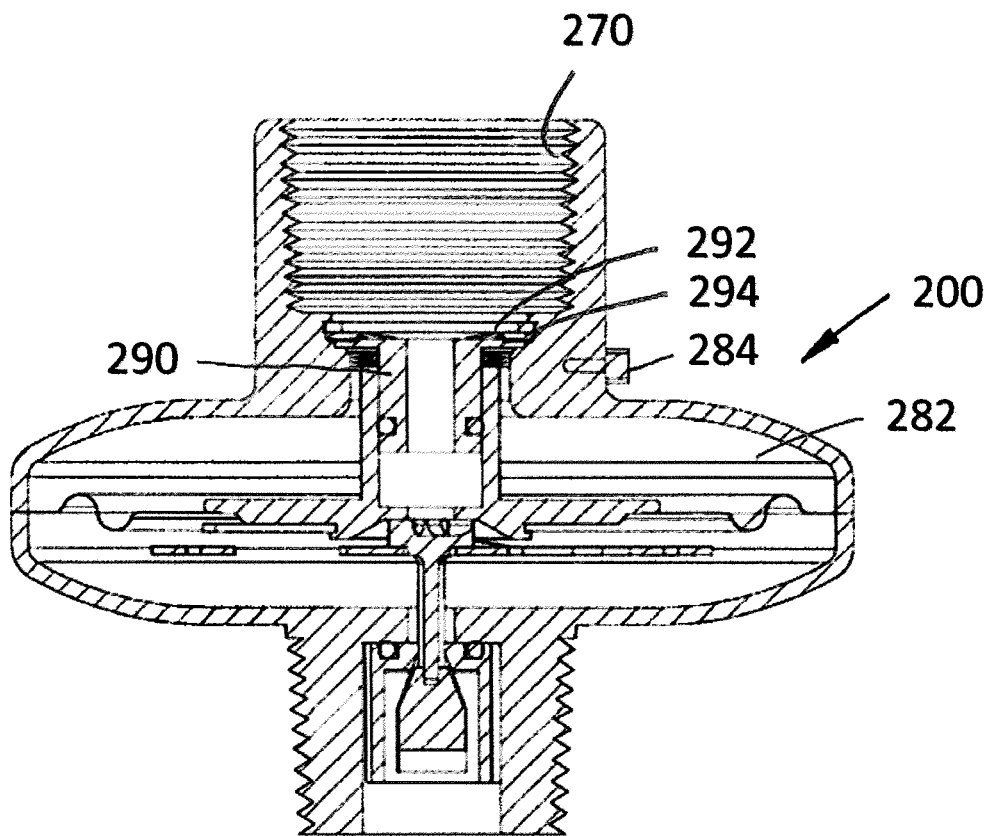
FIG. 9 illustrates an oscillation damper installed in the outlet port of the regulator.
Figure 10:
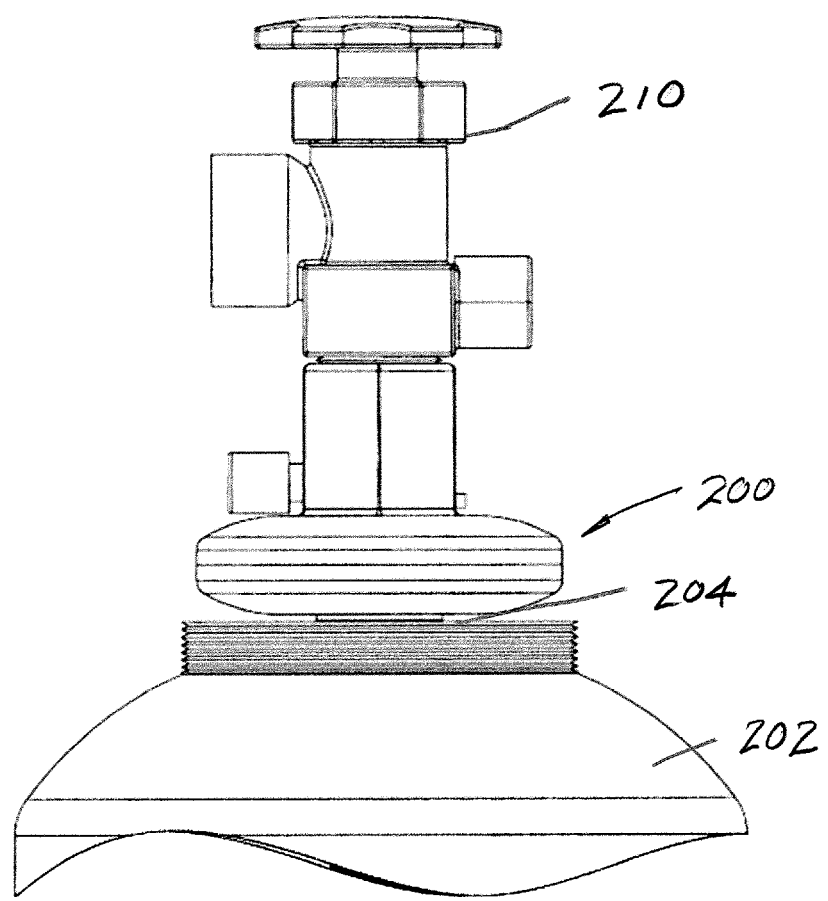
FIG. 10 shows a cylinder, with the regulator installed therein, a cylinder valve installed into the regulator, and a reset member for an excess flow valve.
Figure 11:
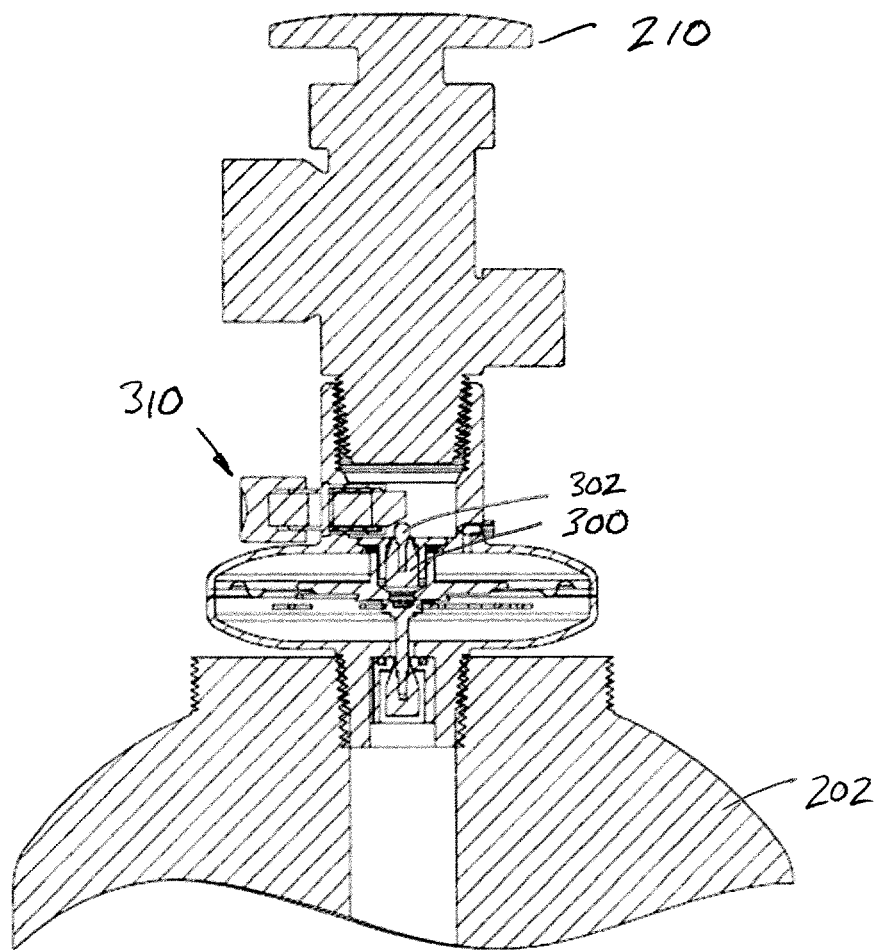
FIG. 11 is a longitudinal cross-sectional view of FIG. 10 showing the internal components.
Figure 12:
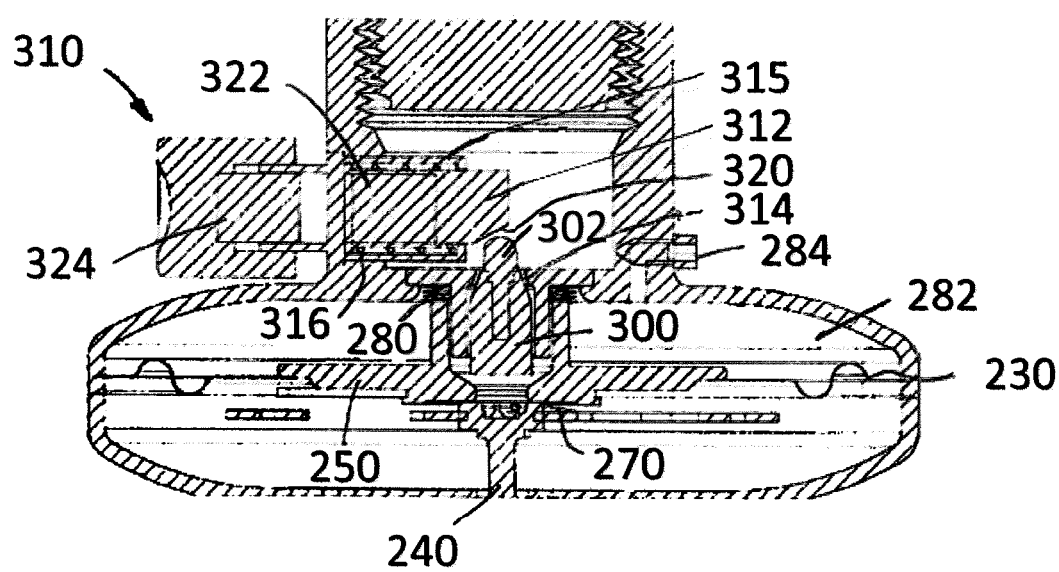
FIG. 12 is an enlarged view of the internal components of the regulator and reset member of FIG. 11.
Figure 13:
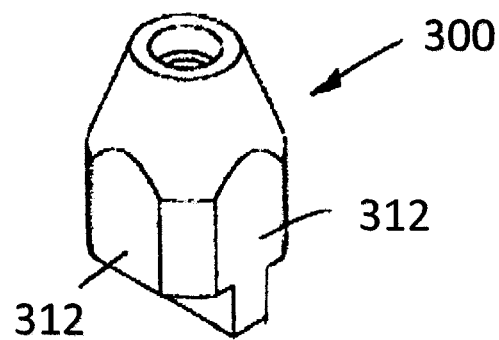
FIG. 13 is an enlarged view of the poppet particularly illustrating flats on the poppet.
Figure 14:
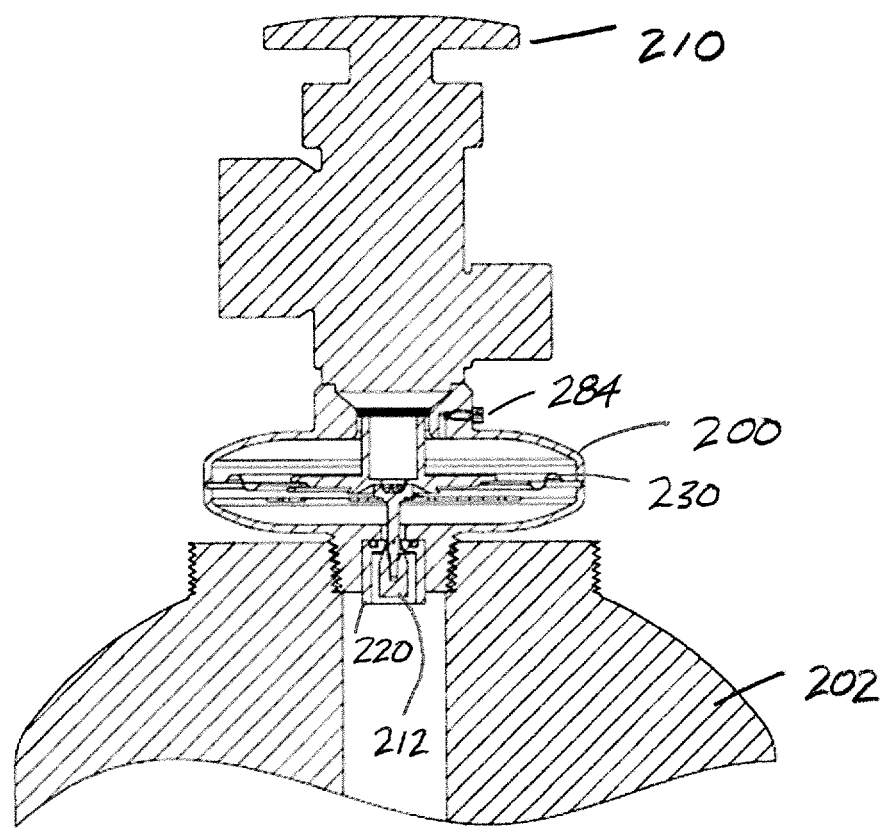
FIG. 14 is a longitudinal cross-sectional view of the regulator of FIG. 5 assembled in the cylinder, and receiving a cylinder valve in an outlet of the regulator.

An oscillation damper 290 (FIG. 9) can be installed or removed through the outlet port 270 of the regulator 200. Regulators controlling high flows require an oscillation damper 290 to prevent the diaphragm 230 from going into an out-of-control oscillation mode. This oscillation damper 290 has a slight negative impact on the low flow operation of the regulator 200. A feature of this regulator 200 is that this damper 290 can be installed or removed through the outlet port 270 of the regulator. The damper 290 is preferably held in place by a wave spring 292 and retaining clip 294—also both inserted through the outlet port 270. In low flow applications, the damper 290 can easily be removed with standard retaining ring pliers. This is not possible with a preset regulator such as shown and described with respect to FIGS. 2-3.

Referring to FIGS. 10-13, in the center of the regulator 200 there is shown an excess flow valve shut off poppet 300. It is similar to the regulator poppet 212 in the way it stops the flow but the excess flow valve shut off poppet 300 is not tied to the first flexible member or first diaphragm/bellows 230. The excess flow valve shut off poppet 300 has a hard member or steel nub 302 screwed into it so the poppet can be pushed down (opened) by a reset mechanism or button 310. The poppet 300 has one or more flat sides 312 (FIG. 13) thereon to provide a flow passage that is below the trip point. If the flow exceeds the amount that can get by the poppet 300 provided by the passageway created by the flat(s) 312, the poppet 300 is forced up to the shut off position and engages an excess flow valve poppet seat 314 best illustrated in FIGS. 11 and 12 that has a tapered opening. The bellows 280 extends in sealed relation between the faceplate 250 of the first diaphragm/bellows 230 and the excess flow valve poppet seat 314 to form the sealed pressure chamber 282, and the internal pressure of the sealed pressure chamber 282 can be selectively altered or controlled through charge port 284.

Above the poppet 300 is a piston 312, and a cylindrical tube 314 for the piston to slide in. There is a spring return 316 in the cylinder 314 to urge the piston 312 to the left (as shown). The piston 312 has a taper 320 on one side that will push the poppet 300 down (open) when the piston moves to the right (as shown). There is a flat portion on the piston 312 that rides along a flat portion of the cylinder 314 so that the piston cannot rotate. There is a magnet 322 embedded inside of the piston 312 that is repelled by a magnet 324 outside of the regulator 200, and the magnet 324 is embedded inside the reset button 310. Pressing the button 310 causes the sliding movement. When the operator first opens the cylinder valve 210 there will be a rush of flow that will trigger the excess flow valve 300, the operator will then have to push and hold the button 310 in until the flow stabilizes, then the operator can release the button.

Although specific advantages have been enumerated above, various embodiments may include some, none, or all of the enumerated advantages. Although exemplary embodiments are illustrated in the figures and description herein, the principles of the present disclosure may be implemented using any number of techniques, whether currently known or not. Moreover, the operations of the systems and apparatuses disclosed herein may be performed by more, fewer, or other components, and the methods described herein may include more, fewer, or other steps. Additionally, steps may be performed in any suitable order.

To aid the Patent Office and any readers of this application and any resulting patent, applicant does not intend any of the appended claims or claim elements to invoke 35 USC 112 (f) unless the words "means for" or "step for" are explicitly used.

What is claimed is:

1. A regulator comprising:
   a body enclosing a cavity, and an inlet passage configured to attach to an associated gas cylinder and an outlet passage configured to attach to an associated cylinder valve, the inlet and outlet passages in selective fluid communication with one another;
   first and second flexible diaphragms or bellows interposed between the inlet and outlet passages that form a pressure chamber therebetween;
   a poppet assembly located between the inlet and outlet passages that selectively seals with a poppet seat to regulate fluid flow between the inlet and outlet passages; and
   a charge port that selectively communicates from external to the body with the pressure chamber between the first flexible diaphragm or bellows and the second flexible diaphragm or bellows to set or reset a pressure in the pressure chamber.

2. The regulator of claim 1 wherein the poppet assembly includes a poppet stem connected to a poppet and to one of the first or second flexible diaphragm or bellows.

3. The regulator of claim 1 further comprising an oscillation damper received in the body to prevent the first diaphragm ori_bellows from going into an out of control oscillation mode.

4. The regulator of claim 3 wherein the oscillation damper is dimensioned for receipt in the body through the outlet passage.

5. The regulator of claim 1 further comprising an excess flow valve received in the body between the inlet passage and the outlet passage.

6. The regulator of claim 5 wherein the excess flow valve operates independently of the first diaphragm or bellows.

7. The regulator of claim 5 wherein the excess flow valve includes a shut off poppet that selectively engages an excess flow valve seat.

8. The regulator of claim 7 further comprising a reset mechanism that selectively engages the excess flow valve and moves the excess flow valve shut off poppet from an engaged position with the excess flow valve seat.

9. The regulator of claim 8 wherein the reset mechanism includes a hard member mounted on the excess flow valve shut off poppet, and the reset mechanism includes a piston that selectively engages the hard member to move the excess flow valve shut off poppet from the engaged position with the excess flow valve seat.

10. The regulator of claim 9 wherein the piston includes a tapered surface that selectively engages the hard member of the excess flow valve.

11. A regulator comprising:
    a body enclosing a cavity, and an inlet passage configured to attach to an associated gas cylinder and an outlet passage configured to attach to an associated cylinder valve, the inlet and outlet passages in selective fluid communication with one another;
    a flexible diaphragm or bellows interposed between the inlet and outlet passages;
    a poppet assembly located between the inlet and outlet passages that selectively seals with a poppet seat to regulate fluid flow between the inlet and outlet passages, wherein the poppet assembly includes a poppet stem connected to a poppet and to the flexible diaphragm or bellows; and
    a component having first and second states, the first state limiting flow in a gas cylinder filling direction from the outlet passage to the inlet passage of the regulator, and a second state permitting flow in the gas filling direction.

12. The regulator of claim 11 wherein the component is a sliding component having a seal member thereon that seals with the body in the first state, and is spaced from the body in the second state.

13. The regulator of claim 12 wherein the sliding component includes a recess that receives the poppet therein, and the sliding component includes at least one channel on an external surface thereof.

14. The regulator of claim 13 wherein the sliding component includes an opening at one end of the recess, the opening dimensioned to receive the poppet stem therethrough, and the sliding component forms a poppet seat that the poppet selectively engages.

15. The regulator of claim 14 wherein the poppet stem selectively engages a faceplate of the flexible diaphragm or bellows that includes a passage therethrough that communicates with the inlet and outlet passages of the regulator.

16. The regulator of claim 11 further comprising a charge port that selectively communicates from external to the regulator with a pressure chamber between the flexible diaphragm or bellows and a second flexible diaphragm or bellows to set or reset a pressure in the pressure chamber.

17. A regulator comprising:
    a body enclosing a cavity, and an inlet passage configured to attach to an associated gas cylinder and an outlet passage configured to attach to an associated cylinder valve, the inlet and outlet passages in selective fluid communication with one another;

a flexible diaphragm or bellows interposed between the inlet and outlet passages;

a poppet assembly located between the inlet and outlet passages that selectively seals with a poppet seat to regulate fluid flow between the inlet and outlet passages;

an excess flow valve received in the body between the inlet passage and the outlet passage, the excess flow valve including a shut off poppet that selectively engages an excess flow valve seat;

a reset mechanism that selectively engages the excess flow valve and moves the excess flow valve shut off poppet from an engaged position with the excess flow valve seat, wherein the reset mechanism includes a hard member mounted on the excess flow valve shut off poppet, and the reset mechanism includes a piston that selectively engages the hard member to move the excess flow valve shut off poppet from the engaged position with the excess flow valve seat, and wherein the reset mechanism includes a tube that slidingly receives the piston therein, and the piston includes a first magnet therein and the reset mechanism includes a second magnet located externally of the regulator body.

18. The regulator of claim 17 wherein the first magnet and the second magnet are oriented to repel so that the piston engages the hard member and resets the excess flow valve when the second magnet is advanced toward the first magnet.

19. The regulator of claim 18 further comprising a spring in the tube that urges the piston toward the second magnet.

* * * * *